US007369513B1

(12) United States Patent
Sankaran

(10) Patent No.: US 7,369,513 B1
(45) Date of Patent: May 6, 2008

(54) METHOD AND APPARATUS FOR DETERMINING A NETWORK TOPOLOGY BASED ON SPANNING-TREE-ALGORITHM-DESIGNATED PORTS

(75) Inventor: Ganesh C. Sankaran, Tamil Nadu (IN)

(73) Assignee: Cisco Technology, Inc., San Jose, CA (US)

( * ) Notice: Subject to any disclaimer, the term of this patent is extended or adjusted under 35 U.S.C. 154(b) by 976 days.

(21) Appl. No.: 10/439,989

(22) Filed: May 16, 2003

(51) Int. Cl.
*H04L 12/28* (2006.01)

(52) U.S. Cl. ..................................... 370/256

(58) Field of Classification Search ................ 370/254, 370/255, 256, 351, 401, 408; 709/224, 227
See application file for complete search history.

(56) References Cited

U.S. PATENT DOCUMENTS

| 5,835,720 | A | * | 11/1998 | Nelson et al. .............. 709/224 |
| 6,377,987 | B1 | * | 4/2002 | Kracht ....................... 709/220 |
| 6,587,440 | B1 | * | 7/2003 | Dawes ....................... 370/255 |
| 6,697,338 | B1 | * | 2/2004 | Breitbart et al. ............ 370/254 |
| 6,928,475 | B2 | * | 8/2005 | Schenkel et al. ........... 709/224 |
| 7,127,523 | B2 | * | 10/2006 | Kotser ....................... 709/238 |
| 2002/0154606 | A1 | * | 10/2002 | Duncan et al. ............. 370/256 |
| 2004/0221041 | A1 | * | 11/2004 | Tabbara ...................... 709/227 |

OTHER PUBLICATIONS

Cisco Systems, "CDP, Introduction," http://www.cisco.com/en/US/tech/tk648/tk362/tk100/tech_protocol_home.html, printed Aug. 18, 2003, 1 page.

Yuri Breitbart, et al., "Topology Discovery in Heterogeneous IP Networks," undated, http://www.bell-labs.com/user/minos/Papers/infocom00-cam.pdf, 10 pages,—2003.

K. McCloghrie, et al., "Management Information Base for Network Management of TCP/IP-based internets," Request for Comments: 1156, http://www.ietf.org/rfc/rfc1156.txt?number=1156, printed Aug. 18, 2003, pp. 1-85.

K. McCloghrie, et al., "Management Information Base for Network Management of TCP/IP-based internets: MIB-II," Request for Comments: 1213, http://www.ietf.org/rfc/rfc1213.txt?number=1213, printed Aug. 18, 2003, pp. 1-66.

E. Decker, et al., "Definitions of Managed Objects for Bridges," Request for Comments: 1493, http://www.ietf.org/rfc/rfc1493.txt?number=1493, printed Aug. 18, 2003, pp. 1-32.

J. Case, et al., "A Simple Network Management Protocol (SNMP)," Request for Comments: 1157, http://www.ietf.org/rfc/rfc1157?number=1157, printed Aug. 18, 2003, pp. 1-34.

IEEE, "Part 3: Media Access Control (MAC) Bridges," IEEE Standard for Information Technology, Telecommunications and information exchange between systems, Local and metropolitan area networks, Common specifications, ANSI/IEEE Std 802.1D, 1998 Edition, pp. 1-373 (text provided on CD-ROM).

* cited by examiner

*Primary Examiner*—Edan Orgad
*Assistant Examiner*—Betty Lee
(74) *Attorney, Agent, or Firm*—Hickman Palermo Truong & Becker LLP

(57) ABSTRACT

A method of determining a network topology based on Spanning-tree-Algorithm-designated ports is disclosed. A first Spanning-tree-Algorithm-designated port that is associated with a network interface of a first network device is determined. A second Spanning-tree-Algorithm-designated port that is associated with a network interface of a second network device is determined. Based on the first designated port and the second designated port, it is determined whether the network interface of the first network device is connected to the network interface of the second network device.

22 Claims, 5 Drawing Sheets

METHOD AND APPARATUS FOR DETERMINING A NETWORK TOPOLOGY BASED ON SPANNING-TREE-ALGORITHM-DESIGNATED PORTS

FIELD OF THE INVENTION

The present invention generally relates to computer network topology. The invention relates more specifically to a method and apparatus for determining a network topology based on Spanning-tree-Algorithm-designated ports.

BACKGROUND OF THE INVENTION

The approaches described in this section could be pursued, but are not necessarily approaches that previously have been conceived or pursued. Therefore, unless otherwise indicated herein, the approaches described in this section are not prior art to the claims in this application and are not admitted to be prior art by inclusion in this section.

Computers and other devices equipped with network interface hardware may be connected together to form a network that allows the devices to communicate data with each other. An example of such a network is a local area network (LAN). A LAN may be composed of several different LAN segments. All devices connected to a given LAN segment receive all of the data communicated through the given LAN segment.

For example, a LAN segment's data traffic may be transmitted over a single cable that functions as a bus. In such a configuration, all devices connected to the single cable receive all of the data communicated over the single cable, although individual devices may implement filters to selectively ignore some of the received data.

For another example, a LAN segment's data traffic may be transmitted over multiple cables that are interconnected through one or more network hubs. When a network hub receives data through a cable that is connected to one of the network hub's network interfaces, the network hub repeats the data through all of the other cables that are connected to the network hub's other network interfaces. Every device that is connected to one of the other cables receives the data. Like a single cable, the network hub operates at the physical layer of the Open Systems Interconnect (OSI) model. Regardless of whether a particular LAN segment's data traffic is transmitted over a single cable, a set of cables interconnected through one or more network hubs, or through wireless media, every device that is "on" the particular LAN segment receives all of the data that is communicated over the LAN segment.

Two or more LAN segments may be interconnected through a network bridge. Unlike a network hub, which operates at the physical layer of the OSI model, a network bridge operates at the data link layer of the OSI model. A network hub merely repeats received data through all of the network hub's network interfaces other than the network interface on which the data was received. In contrast, a network bridge, in response to receiving data through a cable that is connected to one of the network bridge's network interfaces, selects zero or more of the network bridge's network interfaces through which the data should be transmitted. Each of the network bridge's network interfaces may be connected to a different LAN segment.

For each network frame that the network bridge receives, the network bridge makes this selection based on data link layer address information, such as Media Access Control (MAC) address information, that is indicated within the network frame. For example, based on a destination MAC address indicated in a given network frame, a network bridge may determine that the network frame should be transmitted through a particular one of several of the network bridge's network interfaces in order to send the network frame over a LAN segment that forms part of the route to the network frame's ultimate destination. Another network bridge that is connected to the same LAN segment may receive the network frame and select yet another LAN segment over which the network frame should be transmitted. Thus, a network bridge may interconnect multiple LAN segments, and a LAN segment may interconnect multiple network bridges.

The data link layer topology, or "Layer 2" topology, of a LAN indicates how a LAN's bridges are connected to each other. In other words, a LAN's data link layer topology indicates, for each LAN segment in a LAN, which network bridges are connected to the LAN segment. Network hubs, which may comprise part of a LAN segment, do not need to be indicated distinctly from a LAN segment in a data link layer topology, because, as described above, network hubs operate at the physical layer rather than the data link layer. The data link layer topology of a LAN is a valuable aid in analyzing and configuring the LAN.

While the data link layer topology of a small LAN with few network bridges and LAN segments may be determined manually with reasonable effort, manually determining the data link layer topology of a large LAN with many network bridges and LAN segments can be extremely difficult. The dynamic nature of many LANs compounds the complexity of such a determination. Over time, the data link layer topology of a LAN can change, due to the addition, removal, reconfiguration, or failure of network devices and network media.

To determine the data link layer topology of large, dynamic LANs, several approaches for automatically calculating a LAN's data link layer topology have been devised. Cisco Systems, Inc. developed the Cisco Discovery Protocol (CDP). A particular network bridge that is configured to use CDP can automatically discover other network bridges that are connected to the same LAN segment as the particular network bridge, provided that the other network bridges are also configured to use CDP. Using the information discovered through CDP, the data link layer topology of a LAN may be determined if all of the LAN's network bridges are configured to use CDP. This CDP-based approach was implemented in Cisco Systems, Inc.'s Cisco-Works 2000 product.

While the CDP-based approach is effective in determining the data link layer topology of a LAN in which there are no network bridges that are unable to use CDP, the CDP-based approach may fail to determine the complete data link layer topology of a LAN in which there are one or more network bridges that are not CDP-enabled. Unfortunately, many existing LANs contain network bridges that are not CDP-enabled.

Another approach to automatically determining the data link layer topology of large, dynamic LANs may be called the MAC-based approach. The MAC-based approach takes advantage of MAC address information contained in Management Information Bases (MIBs) to determine a LAN's data link layer topology. MIBs are described in the Internet Engineering Task Force (IETF) Request For Comments (RFC) 1156 and in IETF RFC 1213. A specific Bridge MIB, described in IETF RFC 1493, specifies an object named "dot1dTpFdbTable"; "dot1d" refers to the Institute of Electrical and Electronics Engineers (IEEE) 802.1d standard.

Each network bridge maintains a dot1dTpFdbTable object. The dot1dTpFdbTable object contains information about unicast entries for which the network bridge has forwarding or filtering information. The network bridge uses such entries to determine how to propagate a received network frame. Each dot1dTpFdbTable object is an collection of one or more "dot1dTpFdbEntry" objects.

Each dot1dTpFdbEntry object contains a "dot1dTpFdbAddress" object and an associated "dot1dTpFdbPort" object. The value of a dot1dTpFdbAddress object is a MAC address, and the value of a dot1dTpFdbPort object identifies one of the network bridge's network interfaces. After receiving a network frame, a network bridge transmits the network frame through the network interface associated with the network frame's destination MAC address.

In order to determine whether a first network bridge's network interface and a second network bridge's network interface are connected to the same LAN segment, the MAC-based approach obtains all of the values of the dot1dTpFdbAddress and dot1dTpFdbPort objects maintained by the first network bridge, and all of the values of the dot1dTpFdbAddress and dot1dTpFdbPort objects maintained by the second network bridge. Based on these values, the MAC-based approach determines whether any of the obtained MAC addresses are associated with both the first network bridge's network interface and the second network bridge's network interface. If at least one of the MAC addresses is associated with both of the network interfaces, then the network interfaces are not connected to the same LAN segment. If none of the MAC addresses is associated with both of the network interfaces, then the network interfaces are connected to the same LAN segment.

Therefore, in order to determine the data link layer connectivity between just two network bridges, the MAC-based approach requires values of all of the dot1dTpFdbAddress and dot1dTpFdbPort objects maintained by the first network bridge, and values of all of the dot1dTpFdbAddress and dot1dTpFdbPort objects maintained by the second network bridge. In LANs that contain many network devices, each network bridge maintains many of such objects. Obtaining many MAC addresses and associated network interface identities can take a substantial amount of time and use a substantial amount of bandwidth. From a practical standpoint, the MAC-based approach lacks scalability.

Based on the foregoing, there is a clear need for a scalable method of automatically determining the data link layer topology of a LAN that contains one or more network bridges that are not CDP-enabled.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining a network topology based on Spanning-tree-Algorithm-designated ports is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural Overview
3.0 Functional Overview
4.0 Method of Determining a Network Topology Based on Spanning-Tree-Algorithm-Designated Ports
5.0 Implementation Mechanisms—Hardware Overview
6.0 Extensions and Alternatives 1.0 General Overview The needs identified in the foregoing Background, and other needs and objects that will become apparent from the following description, are achieved in the present invention, which comprises, in one aspect, a method of determining a network topology based on Spanning-tree-Algorithm-designated ports. According to one aspect of the method, a first designated port, which was designated based on the Spanning-tree Algorithm, and which is associated with a network interface of a first network device, is determined. A second designated port, which was also designated based on the Spanning-tree Algorithm, and which is associated with a network interface of a second network device, is determined. Based on the first designated port and the second designated port, it is determined whether the network interface of the first network device is connected to the network interface of the second network device.

Unlike some prior approaches to determining a data link layer topology of a LAN, techniques disclosed herein may be used to determine a complete data link layer topology of a LAN even if some network bridges in the LAN are not configured to use CDP. As a result, techniques disclosed herein may be applied to virtually any LAN. Further, unlike some prior approaches to determining a data link layer topology of a LAN, techniques disclosed herein do not require MAC-address-to-network-interface associations to be retrieved from network bridges. As a result, techniques disclosed herein may be applied even in LANs that contain large numbers of network devices. Techniques disclosed herein are scalable.

In other aspects, the invention encompasses a computer apparatus and a computer-readable medium configured to carry out the foregoing steps.

2.0 Structural Overview

Figure 1:
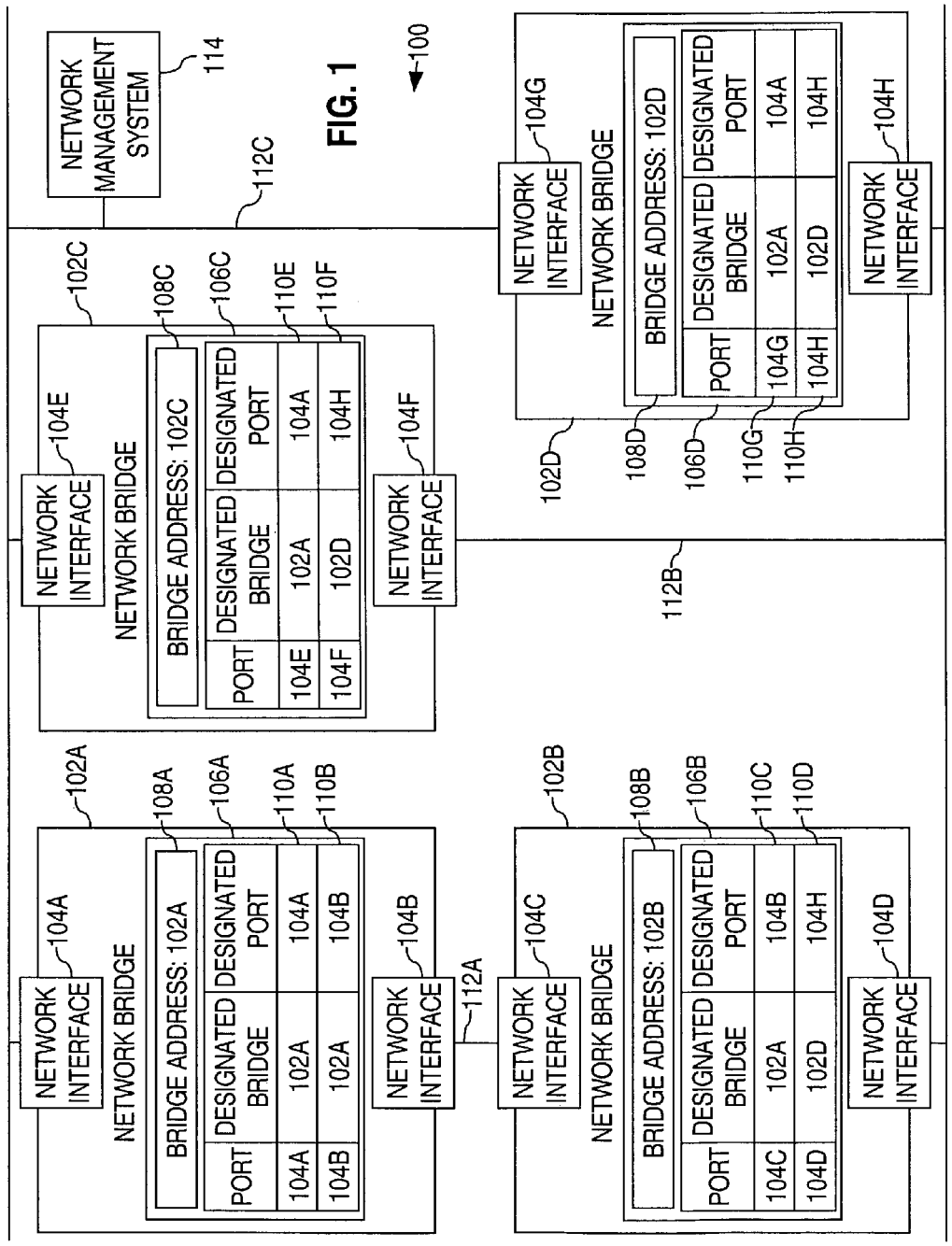
FIG. 1 is a block diagram that illustrates an overview of an example system that may be used to practice a method of determining a network topology based on Spanning-tree-Algorithm-designated ports.

FIG. 1 is a block diagram that illustrates an overview of an example system 100 that may be used to practice a method of determining a network topology based on Spanning-tree-Algorithm-designated ports. System 100 comprises network bridges 102A-102D. While system 100 comprises network bridges 102A-102D, in systems of alternative embodiments, network switches may be substituted for one or more of the network bridges. Further, systems of alternative embodiments may comprise more or fewer network bridges.

Each of network bridges 102A-102D comprises network interfaces. Network bridge 102A comprises network interfaces 104A and 104B. Network bridge 102B comprises network interfaces 104C and 104D. Network bridge 102C comprises network interfaces 104E and 104F. Network bridge 102D comprises network interfaces 104G and 104H. Network bridges of alternative embodiments may comprise more or fewer network interfaces.

System 100 comprises a LAN that comprises separate LAN segments 112A-112C. Various ones of network interfaces 104A-104H are coupled communicatively to various others of the network interfaces through various ones of LAN segments 112A-112C. LAN segment 112A communicatively couples network interfaces 104B and 104C. LAN segment 112B communicatively couples network interfaces 104D, 104F, and 104H. LAN segment 112C communicatively couples network interfaces 104A, 104E, and 104G.

Each of network bridges 102A-102D stores and maintains a separate Bridge MIB. Network bridges 102A-102D store and maintain Bridge MIBs 106A-106D, respectively. Each one of Bridge MIBs 106A-106D comprises a separate bridge address object, such as a "dot1dBaseBridgeAddress" object as specified in IETF RFC 1493. Bridge MIBs 106A-106D comprise bridge address objects 108A-108D, respectively. Each one of bridge address objects 108A-108D indicates a network address, such as a MAC address, of the network bridge that stores the bridge address object. Thus, each one of bridge address objects 108A-108D identifies a different one of network bridges 102A-102D. For example, bridge address object 108A identifies network bridge 102A. By querying a network bridge's bridge address object, the identity of the network bridge may be determined.

Each one of Bridge MIBs 106A-106D further comprises a separate port table object, such as a "dot1dStpPortTable" object as specified in IETF RFC 1493. Each port table object comprises one or more port entry objects, such as "dot1dStpPortEntry" objects as specified in IETF RFC 1493. Each network bridge's Bridge MIB comprises a separate port entry object for each of the network bridge's network interfaces. Bridge MIB 106A comprises port entry objects 110A and 110B. Bridge MIB 106B comprises port entry objects 110C and 110D. Bridge MIB 106C comprises port entry objects 110E and 110F. Bridge MIB 106D comprises port entry objects 110G and 110H. Bridge MIBs of alternative embodiments may comprise more or fewer port entry objects.

Port entry objects 110A-110H are associated with network interfaces 104A-104H, respectively. Each of port entry objects 110A-110H identifies, through a "port" attribute, the network interface with which the port entry is associated. For example, each of port entry objects 110A-110H may comprise a separate IETF RFC 1493 "dot1StpPort" object that identifies an associated network interface. Each of port entry objects 110A-110H further identifies, through a "designated bridge" attribute and a "designated port" attribute, a separate Spanning-tree-Algorithm-designated network bridge and Spanning-tree-Algorithm-designated network interface.

The Spanning-tree Algorithm is published in the IEEE 802.1d specification. In the description herein, "Spanning-tree Algorithm" refers to an implementation in computer software, hardware, or a combination thereof, of the algorithm in such specification that is embodied in or executed by a network device, network management station, network management application, or device application. For each LAN segment in a LAN, the Spanning-tree Algorithm designates a separate network interface that is coupled to the LAN segment. All network bridges coupled to the LAN segment refer to the network interface designated by the Spanning-tree Algorithm as the designated port for the LAN segment. All network bridges coupled to the LAN segment refer to the network bridge that comprises the designated port as the designated bridge for the LAN segment. For any given LAN segment, the Spanning-tree Algorithm designates only one designated bridge and designated port.

According to one embodiment, each of port entry objects 110A-110H comprises a separate "dot1dStpPortDesignatedBridge" object and a separate "dot1dStpPortDesignatedPort" object, both as specified in IETF RFC 1493. The "dot1dStpPortDesignatedBridge" object and the "dot1dStpPortDesignatedPort" object indicate, for the associated network interface, the designated bridge and designated port, respectively, for the LAN segment to which the associated network interface is coupled. According to one embodiment, network bridges 102A-102D execute the Spanning-tree Algorithm, which causes values for each "dot1dStpPortDesignatedBridge" object and each "dot1dStpPortDesignatedPort" object to be stored in one or more physical memory units within one or more network bridges.

For example, the designated bridge for LAN segment 112A is network bridge 102A. The designated port for LAN segment 112A is network interface 104B. Network interfaces 104B and 104C are coupled to LAN segment 112A. Therefore, port entry objects 110B and 110C indicate that the designated bridge associated with network interfaces 104B and 104C is network bridge 102A. Port entry objects 100B and 110C also indicate that the designated port associated with network interfaces 104B and 104C is network interface 104B.

For another example, the designated bridge for LAN segment 112B is network bridge 102D. The designated port for LAN segment 112B is network interface 104H. Network interfaces 104D, 104F, and 104H are coupled to LAN segment 112B. Therefore, port entry objects 110D, 110F, and 110H indicate that the designated bridge associated with network interfaces 104D, 104F, and 104H is network bridge 102D. Port entry objects 110D, 110F, and 110G also indicate that the designated port associated with network interfaces 104D, 104F, and 104H is network interface 104H.

System 100 further comprises a network management system (NMS) 114. NMS 114 is coupled communicatively with the LAN; in this instance, via LAN segment 112C. NMS 114 may be a specially configured computer, process, application, agent, etc. NMS 114 determines, for each of network interfaces 104A-104H, a separate Spanning-tree-Algorithm-designated port that is associated with the network interface. For example, NMS may determine the Spanning-tree-Algorithm-designated ports based on information contained in Bridge MIBs 106A-106D. NMS 114 further determines, based on the Spanning-tree-Algorithm-designated ports, groups of network interfaces 104A-104H that are interconnected at the data link layer. In other words, NMS 114 determines, for each of LAN segments 112A-112C, which network interfaces are coupled directly to the LAN segment.

From the resulting data link layer connections, NMS 114 automatically determines the data link layer topology of a LAN. Because NMS 114 does not rely on CDP, NMS 114 may determine the data link layer topology of a LAN even if the LAN contains one or more network bridges that are not CDP-enabled. Because NMS 114 determines data link layer connections based on a relatively minimal amount of data, NMS may determine the data link layer topology of a LAN even if the LAN contains many network devices.

3.0 Functional Overview

Figure 2:
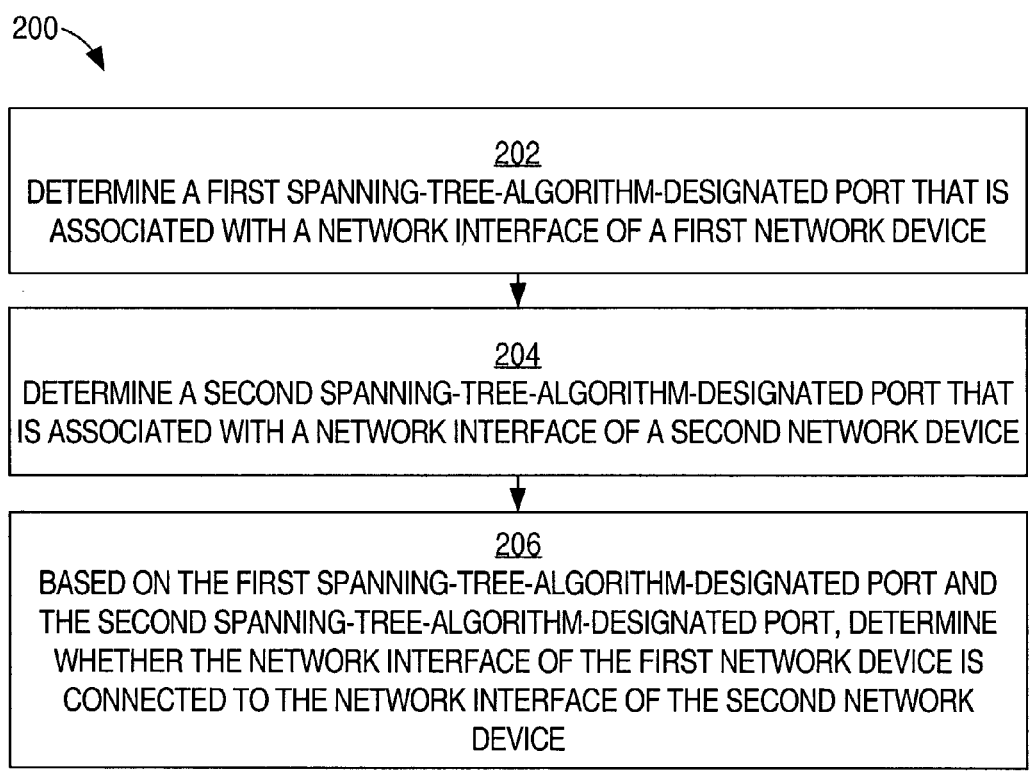
FIG. 2 is a flow diagram that illustrates a high level overview of one embodiment of a method of determining a network topology based on Spanning-tree-Algorithm-designated ports.

FIG. 2 is a flow diagram that illustrates a high level overview of one embodiment of a method 200 of determining a network topology based on Spanning-tree-Algorithm-designated ports. Such a method may be performed by any of many different devices or mechanisms, such as, for example, NMS 114 described above, or by applications or processes, such as network management applications.

In block 202, a first Spanning-tree-Algorithm-designated port that is associated with a network interface of a first network device is determined. For example, NMS 114 may determine from port entry object 110E that network interface 104E is associated with designated port 104A.

In block 204, a second Spanning-tree-Algorithm-designated port that is associated with a network interface of a second network device is determined. For example, NMS 114 may determine from port entry object 110G that network interface 104G is associated with designated port 104A. For another example, NMS 114 may determine from port entry object 110F that network interface 104F is associated with designated port 104H.

In block 206, based on the first Spanning-tree-Algorithm-designated port and the second spanning-tree-algorithm designated port, it is determined whether the network interface of the first network device is connected to the network interface of the second network device. For example, NMS 114 may determine, based on network interfaces 104E and 104G both being associated with the same designated port 104H, that network interfaces 104E and 104G are both connected to the same data link layer LAN segment. For another example, NMS 114 may determine, based on network interfaces 104E and 104F being associated with different designated ports, that network interfaces 104E and 104F are not connected to the same data link layer LAN segment.

As a result of method 200, a data link layer topology of a LAN may be determined automatically and efficiently even if the LAN contains a large number of network devices. Through method 200, a data link layer topology of a LAN may be determined automatically even if the LAN contains heterogeneously designed network bridges.

Figure 3A:
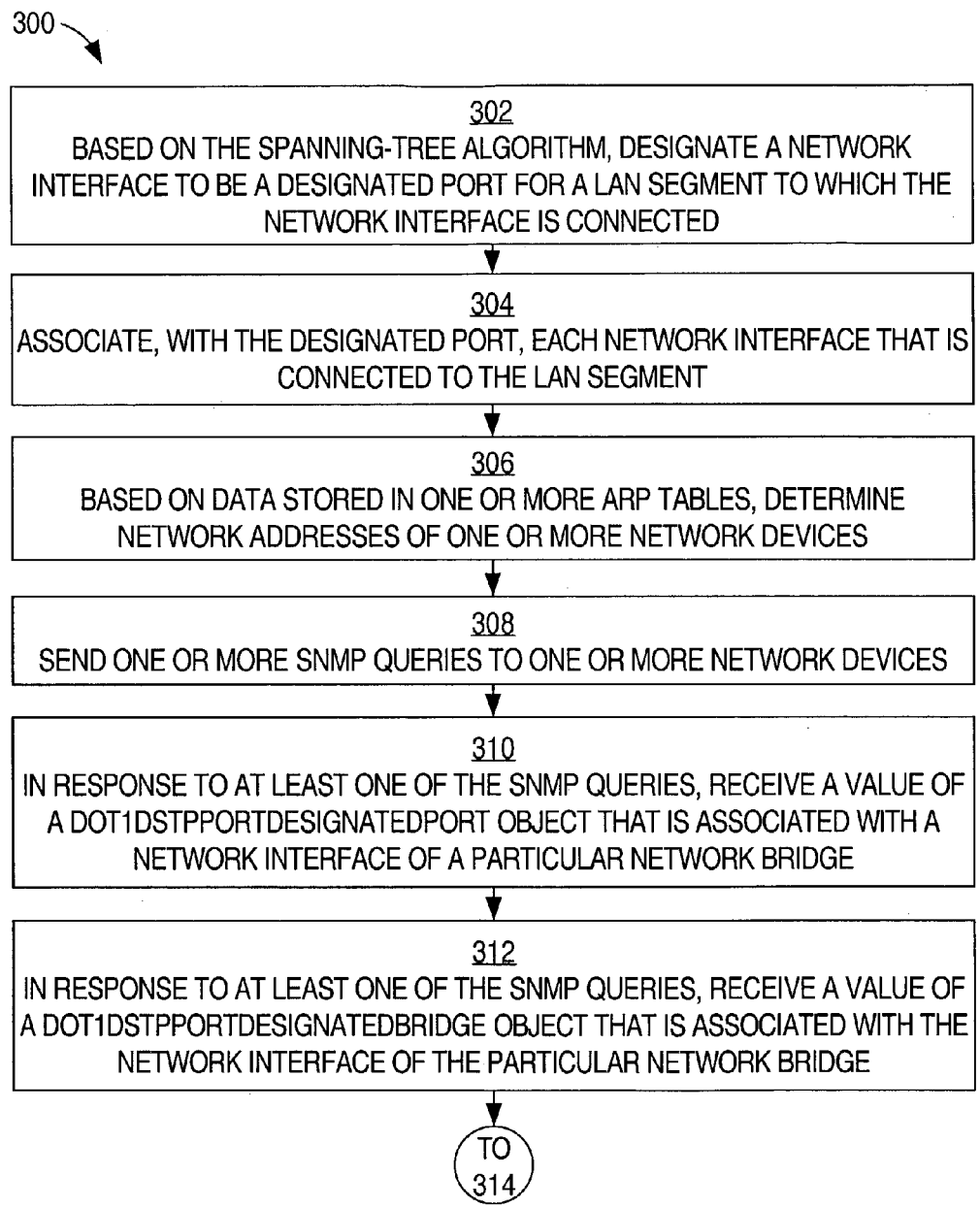
FIG. 3A and FIG. 3B are flow diagrams that illustrate one embodiment of a method of determining a network topology by determining data link layer connections based on querying MIB objects that indicate Spanning-tree-Algorithm-designated ports.
Figure 3B:
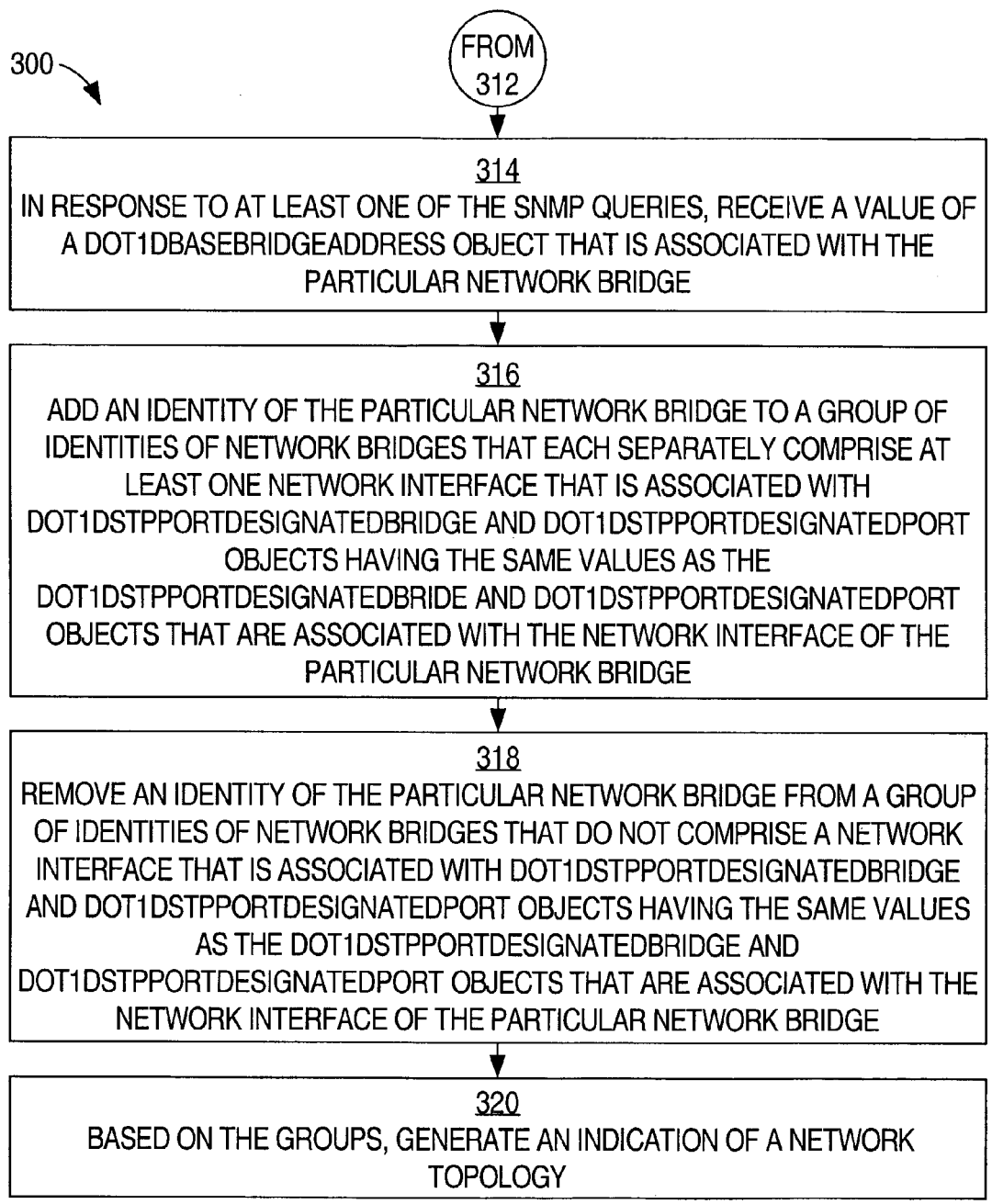

4.0 Method of Determining a Network Topology Based on Spanning-Tree-Algorithm-Designated Ports FIG. 3A and FIG. 3B are flow diagrams that illustrate one embodiment of a method 300 of determining a network topology by determining data link layer connections based on querying MIB objects that indicate Spanning-tree-Algorithm-designated ports. Such a method may be performed by any of many different devices, mechanisms, or processes, such as, for example, NMS 114 described above, or by a network management application.

In block 302, based on the Spanning-tree Algorithm, a network interface is designated to be a designated port for a LAN segment to which the network interface is connected. For example, based on the Spanning-tree Algorithm, network interface 104A may be designated to be the designated port for LAN segment 112C. A different designated port may be designated for each LAN segment. One or more of network bridges 102A-102D may execute the Spanning-tree Algorithm.

In block 304, each network interface that is connected to the LAN segment is associated with the designated port. For example, network interfaces 104A, 104E, and 104G may be associated with designated port 104A. These associations may be stored in port table entries 110A, 10E, and 110G, respectively. Each network interface may be associated with a designated port for the LAN segment to which the network interface is connected. One or more of network bridges 102A-102D may cause such associations to be stored.

In addition to the designated port, each network interface that is connected to the LAN segment is associated with the designated bridge, which is the network bridge that comprises the network interface that is the designated port. Designated bridges transmit inter-LAN-segment traffic. Other network bridges do not transmit data between LAN segments.

In block 306, network addresses of one or more network devices are determined based on data stored in one or more Address Resolution Protocol (ARP) tables. For example, NMS 114 may determine, from one or more ARP tables, Internet Protocol (IP) addresses for network bridges 104A-104D.

While, in one embodiment, network addresses are determined based on data stored in one or more ARP tables, in alternative embodiments, network addresses of network devices in a LAN may be determined in other ways. For example, a network administrator may maintain, manually, a current list of IP addresses for network bridges in a LAN.

In block 308, one or more Simple Network Management Protocol (SNMP) queries are sent to one or more network devices. SNMP is described in IETF RFC 1157. For example, NMS 114 may send SNMP queries to each of the network addresses determined in block 306, including the network addresses of network bridges 104A-104D. Some of the SNMP queries may request the values of the dot1dStpPortDesignatedPort objects associated with network interfaces. Some of the SNMP queries may request the values of the dot1dStpPortDesignatedBridge objects associated with network interfaces. Some of the SNMP queries may request the values of dot1dBaseBridgeAddress objects associated with network bridges.

While, in one embodiment, SNMP queries are sent, in alternative embodiments, network management protocol queries other than SNMP queries may be sent. Common Management Information Protocol (CMIP) is an example of another network management protocol.

In block 310, a value of a dot1dStpPortDesignatedPort object that is associated with a network interface of a particular network bridge is received in response to at least one of the SNMP queries. For example, NMS 114 may receive, in response to an SNMP query that the NMS sent to network bridge 102D, an indication that the value of the dot1dStpPortDesignatedPort object associated with network interface 104G identifies network interface 104A, as indicated by port entry object 110G. NMS 114 also may receive, in response to an SNMP query that the NMS sent to network bridge 102C, an indication that the value of the dot1dStpPortDesignatedPort object associated with network interface 104E identifies network interface 104A, as indicated by port entry object 110E. In this manner, NMS 114 may query the dot1dStpPortDesignatedPort objects associated with each network interface in a LAN.

In block 312, a value of a dot1dStpPortDesignatedBridge object that is associated with the network interface of the particular network bridge is received in response to at least one of the SNMP queries. For example, NMS 114 may receive, in response to an SNMP query that the NMS sent to network bridge 102D, an indication that the value of the dot1dStpPortDesignatedBridge object associated with network interface 104G is the identity of network bridge 102A, as indicated by port entry object 110G. NMS 114 also may receive, in response to an SNMP query that the NMS sent to network bridge 102C, an indication that the value of the dot1dStpPortDesignatedBridge object associated with network interface 104E is the identity of network bridge 102A, as indicated by port entry object 110E. In this manner, NMS 114 may query the dot1dStpPortDesignatedBridge objects associated with each network interface in a LAN.

Together, the value of a network interface's associated dot1dStpPortDesignatedBridge object and the value of the network interface's associated dot1StpPortDesignatedPort object identify the network interface's associated Spanning-tree-Algorithm-designated port.

In block 314, a value of a dot1dBaseBridgeAddress object that is associated with the particular network bridge is received in response to at least one of the SNMP queries. The value of the dot1dBaseBridgeAddress object that is associated with the particular network bridge comprises the identity of the particular network bridge, which distinguishes the particular network bridge from other network bridges in the LAN. The value may be a MAC address of the particular network bridge. For example, NMS 114 may receive, in response to an SNMP query that the NMS sent to network bridge 102D, an indication that the value of the dot1dBaseBridgeAddress object associated with network bridge 102D is the identity of network bridge 102D, as indicated by bridge address object 108D. NMS 114 also may receive, in response to an SNMP query that the NMS sent to network bridge 102C, an indication that dot1dBaseBridgeAddress object associated with network bridge 102C is the identity of network bridge 102C, as indicated by bridge address object 108C. In this manner, NMS 114 may query the dot1dBaseBridgeAddress object associated with each network bridge in a LAN.

In block 316, an identity of the particular network bridge is added to a group of identities of network bridges that each separately comprise at least one network interface that is associated with dot1dStpPortDesignatedBridge and dot1dStpPortDesignatedPort objects having the same values as the dot1dStpPortDesignatedBridge and dot1dStpPortDesignatedPort objects that are associated with the network interface of the particular network bridge. The group comprises identities of network bridges that are connected to the same LAN segment. For example, given a group of identities of network bridges that each separately comprise at least one network interface that is associated with dot1dStpPortDesignatedBridge and dot1DstpPortDesignatedPort objects whose values identify network bridge 102A and network interface 104A, respectively, NMS 114 may add the identities of network bridges 102D and 102C to the group. Based on the composition of the group, NMS 114 may determine that network bridges 102D and 102C are connected to the same LAN segment 112C.

The composition of such groups may change as network bridges are added to, removed from, or interconnected differently within a LAN. Over time, network interfaces may become associated with different Spanning-tree-Algorithm-designated ports. SNMP queries may be sent to network devices periodically in order to detect whether network interfaces that were formerly connected to a LAN segment remain connected to the LAN segment. After a network bridge is disconnected from a LAN segment, the network bridge's identity may be removed from a group of identities of network bridges that are connected to the LAN segment. At any given time, a network bridge's identity may be included in multiple groups, thereby indicating that the network bridge is connected to multiple LAN segments.

In block 318, an identity of the particular network bridge is removed from a group of identities of network bridges that do not comprise a network interface that is associated with dot1dStpPortDesignatedBridge and dot1dStpPortDesignatedPort objects having the same values as the dot1dStpPortDesignatedBridge and dot1dStpPortDesignatedPort objects that are associated with a network interface of the particular network bridge. This removal may be omitted if the identity of the network bridge was not contained in such a group.

In block 320, an indication of a network topology is generated based on the groups. The indication indicates that each network bridge identified in a particular group is connected to a LAN segment that corresponds to the particular group. For example, NMS 114 may generate a graphical representation of a data link layer topology of a LAN based on network bridge identities contained in various groups that correspond to various LAN segments. Among other topographical information, the graphical representation may indicate that network bridge 102D is connected to network bridge 102C through LAN segment 112C. The graphical representation further may indicate, more specifically, that network interface 104A is connected to network interface 104G through LAN segment 112C. Such a graphical representation may be stored on a persistent storage device, printed on paper, displayed to a network administrator, etc.

By periodically performing the techniques described herein, a current LAN topology may be determined periodically. When performed in a large LAN, the techniques described herein involve substantially fewer queries than the MAC-based approach requires.

Unlike some prior approaches to determining a data link layer LAN topology, techniques described herein can determine a connection between a network interface and a LAN segment even if the network interface is not a Spanning-tree-Algorithm-designated port; i.e., even if the network interface is "blocking." For example, even though network interface 104E is not the Spanning-tree-Algorithm-designated port for LAN segment 112C, techniques described herein will determine, nevertheless, that network interface 104E is connected to LAN segment 112C. Thus, all data link layer connections, and not only connections through Spanning-tree-Algorithm-designated ports, may be indicated in a data link layer LAN topology.

5.0 Implementation Mechanisms—Hardware Overview

Figure 4:
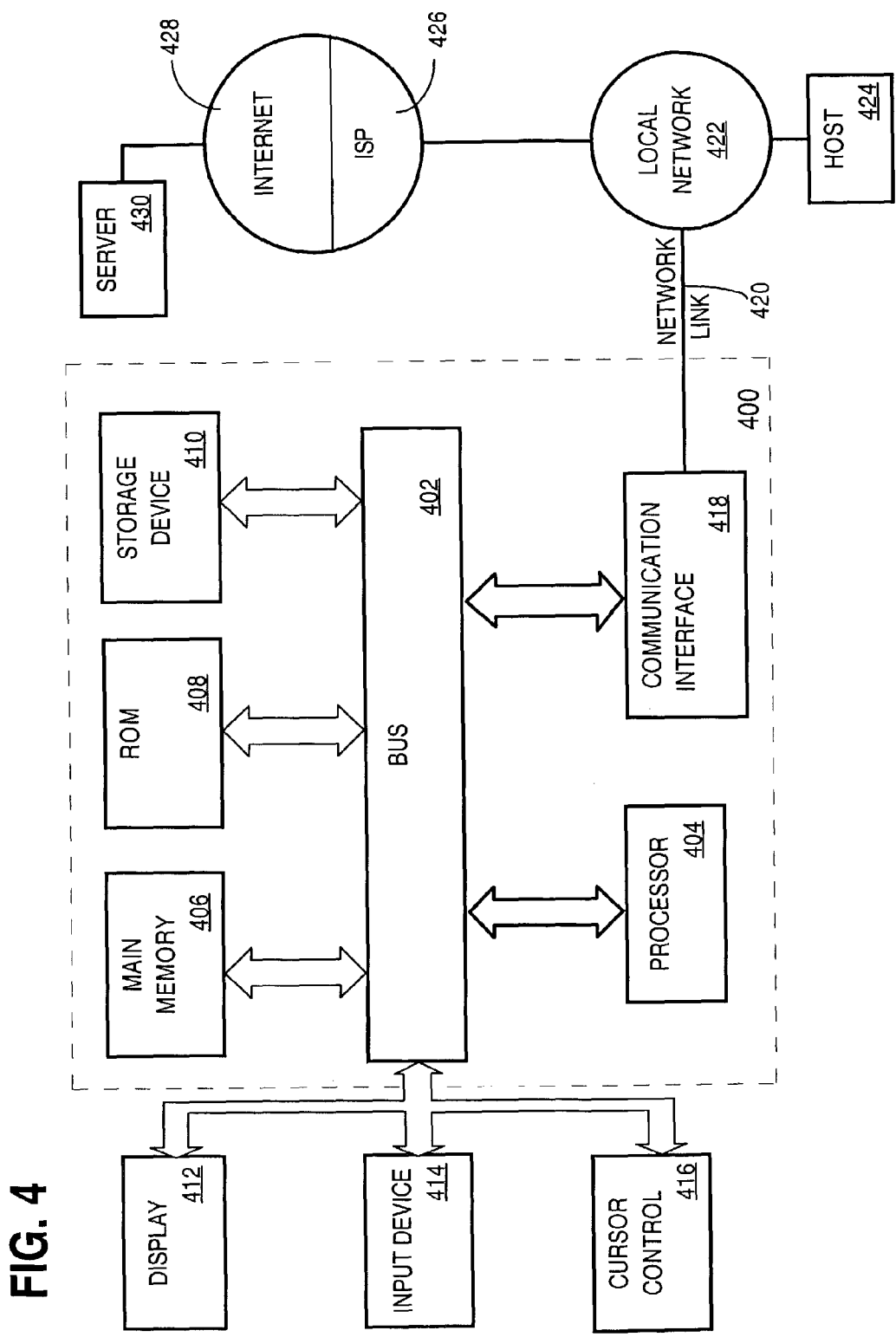
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for determining a network topology based on Spanning-tree-Algorithm-designated ports. According to one embodiment of the invention, determining a network topology based on Spanning-tree-Algorithm-designated ports is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for determining a network topology based on Spanning-tree-Algorithm-designated ports as described herein.

The received code may be executed by processor 404 as it is received, and/or stored in storage device 410, or other non-volatile storage for later execution. In this manner, computer system 400 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, instead of querying MIB objects through a network management protocol such as SNMP, values of MIB objects may be obtained by automatically entering one or more commands through command-line interfaces provided by network bridges.

What is claimed is:

1. A computer-implemented method of determining a network topology based on Spanning-tree-Algorithm-designated ports, the method comprising:
   determining a first Spanning-tree-Algorithm-designated port that is associated with a network interface of a first network device;
   determining a second Spanning-tree-Algorithm-designated port that is associated with a network interface of a second network device;
   determining whether the first Spanning-tree-Algorithm-designated port is the same as the second Spanning-tree-Algorithm-designated port;
   in response to determining that the first Spanning-tree-Algorithm-designated port is the same as the second Spanning-tree-Algorithm-designated port, determining that the network interface of the first network device is connected to the network interface of the second network device on a same local network area (LAN) segment; and
   generating and storing an indication of the network topology that indicates whether the network interface of the first network device is connected to the network interface of the second network device;
   wherein the first network device is different from the second network device and wherein both the first network device and the second network device are different from a designated network device that contains 1) the first Spanning-tree-Algorithm-designated port, 2) the second Spanning-tree-Algorithm-designated port, or 3) both the first and second Spanning-tree-Algorithm-designated ports.

2. The method of claim 1, further comprising the computer-implemented steps of:
   sending one or more queries to the first network device;
   receiving, in response to at least one of the queries, an identity of the first Spanning-tree-Algorithm-designated port.

3. The method of claim 1, further comprising the computer-implemented steps of:
   determining, based on data stored in one or more Address Resolution Protocol (ARP) tables, a network address of the first network device;
   sending one or more queries to the network address;
   receiving, in response to at least one of the queries, from the first network device, an identity of the first Spanning-tree-Algorithm-designated port.

4. The method of claim 1, wherein determining whether the network interface of the first network device is connected to the network interface of the second network device comprises determining that the network interface of the first network device is connected to the network interface of the second network device if the first Spanning-tree-Algorithm-designated port is the second Spanning-tree-Algorithm-designated port.

5. The method of claim 1, wherein determining the first Spanning-tree-Algorithm-designated port is based on information in a Management Information Base (MIB) associated with the first network device.

6. The method of claim 1, further comprising the computer-implemented steps of:
   based on the Spanning-tree Algorithm, designating a particular network interface to be a particular designated port for a local area network (LAN) segment to which the particular network interface is connected; and
   associating, with the particular designated port, each network interface that is connected to the LAN segment.

7. The method of claim 1, wherein:
   determining the first Spanning-tree-Algorithm-designated port comprises determining a first network bridge device that was designated by the Spanning-tree Algorithm to be a designated bridge through which inter-LAN-segment traffic should be transmitted;
   determining the second Spanning-tree-Algorithm-designated port comprises determining a second network bridge device that was designated by the Spanning-tree Algorithm to be a designated bridge through which inter-LAN-segment traffic should be transmitted; and
   determining whether the network interface of the first network device is connected to the network interface of the second network device is based on whether the first network bridge device is the second network bridge device.

8. The method of claim 1, further comprising the computer-implemented steps of:
   after determining that the network interface of the first network device is connected to the network interface of the second network device, performing the steps of:
      determining a third Spanning-tree-Algorithm-designated port that is associated with the network interface of the first network device;
      determining a fourth Spanning-tree-Algorithm-designated port that is associated with the network interface of the second network device; and
      based on the third Spanning-tree-Algorithm-designated port and the fourth Spanning-tree-Algorithm-designated port, determining whether the network interface of the first network device remains connected to the network interface of the second network device.

9. The method of claim 1, further comprising the computer-implemented steps of:
   querying a plurality of network interfaces that comprise the network interface of the first network device and the network interface of the second network device;
   receiving, in response to the querying, an identity of a third Spanning-tree-Algorithm-designated port that is associated currently with the network interface of the first network device;
   receiving, in response to the querying, an identity of a fourth Spanning-tree-Algorithm-designated port that is associated currently with the network interface of the second network device; and
   determining, based on the identity of the third Spanning-tree-Algorithm-designated port that is associated currently with the network interface of the first network device, and based on the identity of the fourth Spanning-tree-Algorithm-designated port that is associated currently with the network interface of the second network device, whether the network interface of the first network device is connected currently to the network interface of the second network device.

10. The method of claim 1, wherein the network interface of the first network device is not a Spanning-tree-Algorithm-designated port.

11. A computer-readable medium carrying one or more sequences of instructions for determining a network topology based on Spanning-tree-Algorithm-designated ports, which instructions, when executed by one or more processors, cause the one or more processors to carry out the steps of:

determining a first designated port that is associated with a network interface of a first network device;

determining a second designated port that is associated with a network interface of a second network device;

determining whether the first Spanning-tree-Algorithm-designated port is the same as the second Spanning-tree-Algorithm-designated port;

in response to determining that the first Spanning-tree-Algorithm-designated port is the same as the second Spanning-tree-Algorithm-designated port, determining that the network interface of the first network device is connected to the network interface of the second network device on a same local network area (LAN) segment; and generating and storing an indication of the network topology that indicates whether the network interface of the first network device is connected to the network interface of the second network device;

wherein the first designated port and the second designated port were designated based on the Spanning-tree Algorithm; and wherein the first network device is different from the second network device and wherein both the first network device and the second network device are different from a designated network device that contains 1) the first designated port, 2) the second designated port, or 3) both the first and second designated ports.

12. An apparatus for determining a network topology based on Spanning-tree-Algorithm-designated ports, comprising:

means for determining a first designated port that is associated with a network interface of a first network device;

means for determining a second designated port that is associated with a network interface of a second network device;

means for determining whether the first Spanning-tree-Algorithm-designated port is the same as the second Spanning-tree-Algorithm-designated port;

means for determining, in response to determining that the first Spanning-tree-Algorithm-designated port is the same as the second Spanning-tree-Algorithm-designated port, that the network interface of the first network device is connected to the network interface of the second network device on a same local network area (LAN) segment; and means for generating and storing an indication of the network topology that indicates whether the network interface of the first network device is connected to the network interface of the second network device;

wherein the first designated port and the second designated port were designated based on the Spanning-tree Algorithm; and wherein the first network device is different from the second network device and wherein both the first network device and the second network device are different from a network device that contains 1) the first designated port, 2) the second designated port, or 3) both the first and second designated ports.

13. An apparatus for determining a network topology based on Spanning-tree-Algorithm-designated ports, comprising:

a network interface that is coupled to a data network for receiving one or more packet flows therefrom;

a processor; and one or more stored sequences of instructions which, when executed by the processor, cause the processor to carry out the steps of:

determining a first designated port that is associated with a network interface of a first network device;

determining a second designated port that is associated with a network interface of a second network device;

determining whether the first Spanning-tree-Algorithm-designated port is the same as the second Spanning-tree-Algorithm-designated port;

in response to determining that the first Spanning-tree-Algorithm-designated port is the same as the second Spanning-tree-Algorithm-designated port, determining that the network interface of the first network device is connected to the network interface of the second network device on a same local network area (LAN) segment; and generating and storing an indication of the network topology that indicates whether the network interface of the first network device is connected to the network interface of the second network device;

wherein the first designated port and the second designated port were designated based on the Spanning-tree Algorithm; and wherein the first network device is different from the second network device and wherein both the first network device and the second network device are different from a network device that contains 1) the first designated port, 2) the second designated port, or 3) both the first and second designated ports.

14. The apparatus of claim 13, wherein the one or more sequences of instructions further comprise instructions which, when executed by the processor, cause the processor to carry out the steps of:

sending one or more queries to the first network device;

receiving, in response to at least one of the queries, an identity of the first Spanning-tree-Algorithm-designated port.

15. The apparatus of claim 13, wherein the one or more sequences of instructions further comprise instructions which, when executed by the processor, cause the processor to carry out the steps of:

determining, based on data stored in one or more Address Resolution Protocol (ARP) tables, a network address of the first network device;

sending one or more queries to the network address;

receiving, in response to at least one of the queries, from the first network device, an identity of the first Spanning-tree-Algorithm-designated port.

16. The apparatus of claim 13, wherein determining whether the network interface of the first network device is connected to the network interface of the second network device comprises determining that the network interface of the first network device is connected to the network interface of the second network device if the first Spanning-tree-Algorithm-designated port is the second Spanning-tree-Algorithm-designated port.

17. The apparatus of claim 13, wherein determining the first Spanning-tree-Algorithm-designated port is based on information in a Management Information Base (MIB) associated with the first network device.

18. The apparatus of claim 13, wherein the one or more sequences of instructions further comprise instructions which, when executed by the processor, cause the processor to carry out the steps of:
- based on the Spanning-tree Algorithm, designating a particular network interface to be a particular designated port for a local area network (LAN) segment to which the particular network interface is connected; and
- associating, with the particular designated port, each network interface that is connected to the LAN segment.

19. The apparatus of claim 13, wherein:
- determining the first Spanning-tree-Algorithm-designated port comprises determining a first network bridge device that was designated by the Spanning-tree Algorithm to be a designated bridge through which inter-LAN-segment traffic should be transmitted;
- determining the second Spanning-tree-Algorithm-designated port comprises determining a second network bridge device that was designated by the Spanning-tree Algorithm to be a designated bridge through which inter-LAN-segment traffic should be transmitted; and
- determining whether the network interface of the first network device is connected to the network interface of the second network device is based on whether the first network bridge device is the second network bridge device.

20. The apparatus of claim 13, wherein the one or more sequences of instructions further comprise instructions which, when executed by the processor, cause the processor to carry out the steps of:
- after determining that the network interface of the first network device is connected to the network interface of the second network device, performing the steps of:
  - determining a third Spanning-tree-Algorithm-designated port that is associated with the network interface of the first network device;
  - determining a fourth Spanning-tree-Algorithm-designated port that is associated with the network interface of the second network device; and
  - based on the third Spanning-tree-Algorithm-designated port and the fourth Spanning-tree-Algorithm-designated port, determining whether the network interface of the first network device remains connected to the network interface of the second network device.

21. The apparatus of claim 13, wherein the one or more sequences of instructions further comprise instructions which, when executed by the processor, cause the processor to carry out the steps of:
- querying a plurality of network interfaces that comprise the network interface of the first network device and the network interface of the second network device;
- receiving, in response to the querying, an identity of a third Spanning-tree-Algorithm-designated port that is associated currently with the network interface of the first network device;
- receiving, in response to the querying, an identity of a fourth Spanning-tree-Algorithm-designated port that is associated currently with the network interface of the second network device; and
- determining, based on the identity of the third Spanning-tree-Algorithm-designated port that is associated currently with the network interface of the first network device, and based on the identity of the fourth Spanning-tree-Algorithm-designated port that is associated currently with the network interface of the second network device, whether the network interface of the first network device is connected currently to the network interface of the second network device.

22. The apparatus of claim 13, wherein the network interface of the first network device is not a Spanning-tree-Algorithm-designated port.

* * * * *